(12) United States Patent
Wood et al.

(10) Patent No.: US 12,504,803 B2
(45) Date of Patent: Dec. 23, 2025

(54) IEC NOTEBOOK LIMITED POWER SOURCE COMPLIANCE WITH USB-C PORT CONTROLLER

(71) Applicant: DELL PRODUCTS L.P., Round Rock, TX (US)

(72) Inventors: Merle J. Wood, Round Rock, TX (US); Chin-Jui Liu, Taoyuan (TW); Ken Nicholas, Leander, TX (US); Marcin Nowak, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 107 days.

(21) Appl. No.: 18/354,521

(22) Filed: Jul. 18, 2023

(65) Prior Publication Data
US 2025/0028375 A1    Jan. 23, 2025

(51) Int. Cl.
G06F 1/26    (2006.01)
G06F 13/42    (2006.01)

(52) U.S. Cl.
CPC .......... G06F 1/266 (2013.01); G06F 13/4282 (2013.01); *G06F 2213/0042* (2013.01)

(58) Field of Classification Search
CPC ................. G06F 1/266; G06F 13/4282; G06F 2213/0042
See application file for complete search history.

(56) References Cited

U.S. PATENT DOCUMENTS

| | | | |
|---|---|---|---|
| 11,573,618 B2 | 2/2023 | Sultenfuss et al. | |
| 2015/0339250 A1* | 11/2015 | Yu | H04M 1/2535 710/14 |
| 2016/0197734 A1* | 7/2016 | Darshan | H04L 12/10 307/1 |
| 2017/0060216 A1* | 3/2017 | Waters | G06F 1/30 |
| 2018/0097315 A1* | 4/2018 | Guo | G06F 1/26 |
| 2019/0044322 A1* | 2/2019 | Hijazi | G06F 1/28 |
| 2019/0319410 A1* | 10/2019 | Mondal | G06F 13/4282 |
| 2019/0324510 A1* | 10/2019 | Hijazi | G06F 1/1613 |
| 2020/0174546 A1 | 6/2020 | Bodnaruk et al. | |
| 2020/0348723 A1* | 11/2020 | Wood, III | G06F 13/385 |
| 2021/0223838 A1* | 7/2021 | Yeh | G06F 1/266 |
| 2021/0405720 A1* | 12/2021 | Scheel | G06F 1/263 |
| 2022/0326284 A1* | 10/2022 | Kim | G01R 19/16576 |
| 2022/0368221 A1* | 11/2022 | Nagano | H02M 1/0025 |
| 2022/0416642 A1* | 12/2022 | Satyanarayana | H02M 1/32 |
| 2023/0305615 A1* | 9/2023 | Natarajan | G06F 13/4282 |

(Continued)

*Primary Examiner* — Aurel Prifti
(74) *Attorney, Agent, or Firm* — Larson Newman, LLP

(57) ABSTRACT

An information handling system includes a power supply configured to provide a main power bus and a secondary power bus and a USB-C port. The USB-C port includes a connector that provides an internal power bus, an input selector that couples the internal power bus to the main power bus, and a controller that enables/disables the coupling of the internal power bus to the main power bus by the input selector, and selectively couple the secondary power bus to the internal power bus. The controller further determines that an over-voltage condition is exhibited on the first internal power bus, and, in response to determining the over-voltage condition, disables the first input selector from coupling the first internal power bus to the main power bus and uncouples the secondary power bus from the first internal power bus.

12 Claims, 2 Drawing Sheets

(56) References Cited

U.S. PATENT DOCUMENTS

2024/0126358 A1* 4/2024 Lin ..................... H02J 7/0068
2024/0184345 A1* 6/2024 Ram ..................... G06F 1/28
2024/0220436 A1* 7/2024 Diaz .................. G06F 13/4282

* cited by examiner

IEC NOTEBOOK LIMITED POWER SOURCE COMPLIANCE WITH USB-C PORT CONTROLLER

FIELD OF THE DISCLOSURE

This disclosure generally relates to information handling systems, and more particularly relates to providing IEC Notebook Limited Power Source (LPS) compliance with a USB-C port controller.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a power supply configured to provide a main power bus and a secondary power bus and a USB-C port. The USB-C port may include a connector that provides an internal power bus, an input selector that couples the internal power bus to the main power bus, and a controller that enables/disables the coupling of the internal power bus to the main power bus by the input selector, and selectively couple the secondary power bus to the internal power bus. The controller may further determine that an over-voltage condition is exhibited on the first internal power bus, and, in response to determining the over-voltage condition, disable the first input selector from coupling the first internal power bus to the main power bus and uncouple the secondary power bus from the first internal power bus.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
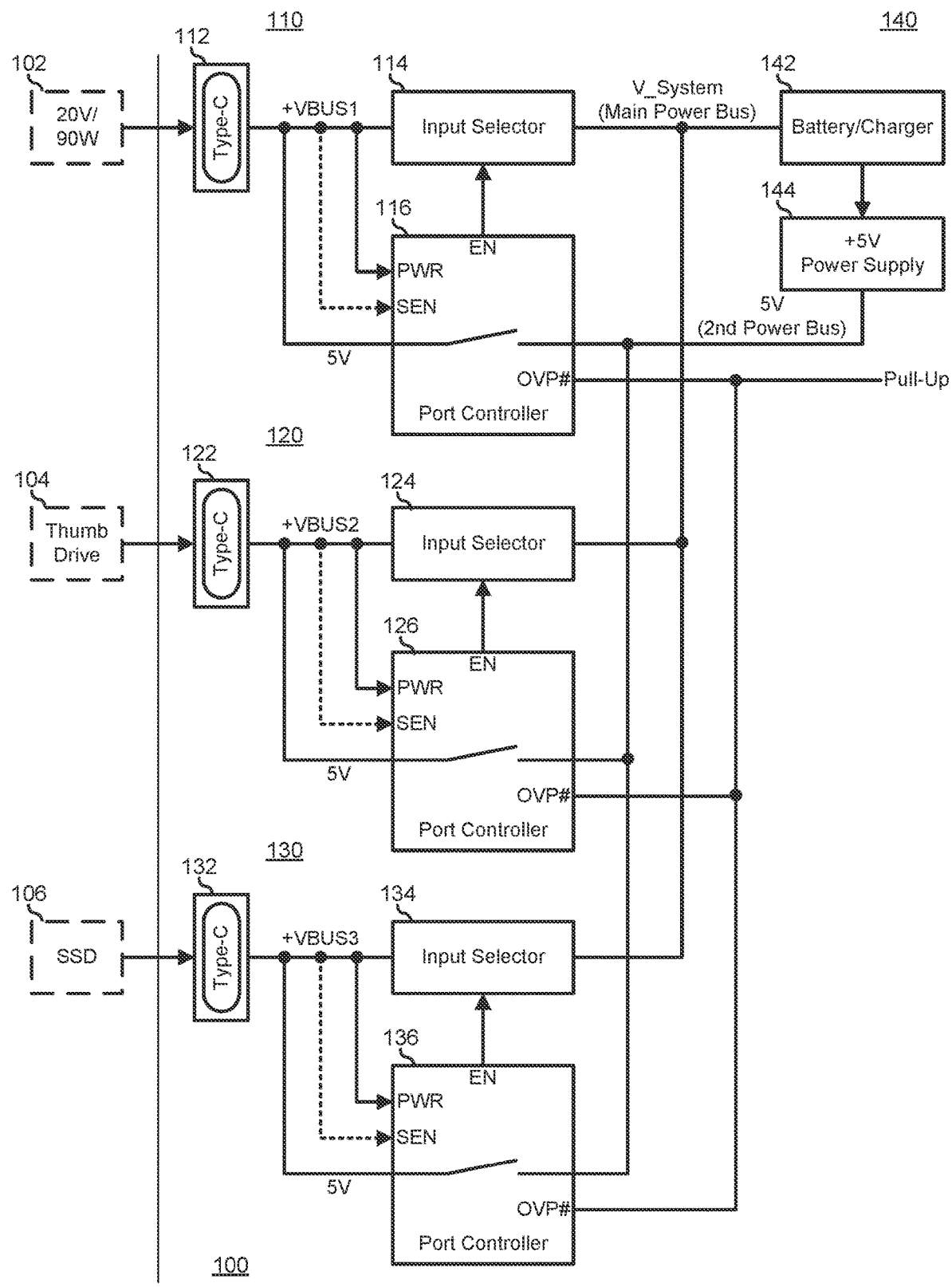
FIG. 1 is a block diagram of an information handling system according to an embodiment of the current disclosure.

FIG. 1 illustrates a USB-C power distribution portion of an information handling system 100, including a first USB-C port 110, a second USB-C port 120, a third USB-C port 130, and a system power supply 140. USB-C port 110, 120, and 130 (hereinafter referred to as "ports 110-130), each include a respective USB-C connector receptacle 112, 122, and 132 (hereinafter referred to as "connectors 112-132), respective input selectors 114, 124, and 134 (hereinafter referred to as "selectors 114-134), and respective USB-C port controllers 116, 126, and 136 (hereinafter referred to as "controllers 116-136). System power supply 140 includes a main power bus (battery/charger module 142) and a secondary power bus (five (5) V power supply 144). Ports 110-130 represent circuits instantiated in information handling system 100 that are configured to manage the power flows to and from respective connectors 112-132 and system power supply 140, as specified by the USB Power Delivery Specification, Revision 3.1. In this regard, FIG. 1 does not show data paths related to ports 110-130, and such data paths will not be further described herein, except as may be needed to illustrate the current embodiments.

Connector 112 includes power pins to source/receive power from a connected device. As such, connector 112 provides an internal power bus (+VBUS1) that is connected via a system main power bus (V_System) to battery/charger 142 through selector 114, and that is connected via a five (5) volt bus (5V) to power supply 144 through controller 116. Controller 116 thus includes an enable output (EN) that controls selector 114 to switch the internal power bus (+VBUS1) to the system main power bus (V_System), and includes an internal switch to switch the internal power bus (+VBUS1) to the 5V bus. Similarly, connector 122 includes power pins to source/receive power from a connected device and provides an internal power bus (+VBUS2) that is connected to the system main power bus (V_System) through selector 124, and to the 5V bus through controller 126, and connector 132 includes power pins to source/receive power from a connected device and provides an internal power bus (+VBUS3) that is connected to the system main power bus (V_System) through selector 134, and to the 5V bus through controller 136. As such, controller 126 includes an enable output (EN) that controls selector 124 and an internal switch for the 5V bus, and controller 136 includes an enable output (EN) that controls selector 134 and an internal switch for the 5V bus.

Ports 110-130 operate to detect the types of devices connected to respective connectors 112-132, to manage the data communication with the devices as needed to implement the power management functions of the ports, to connect the desired system power buses (V_System and 5V) to the connectors' internal buses (+VBUS1, +VBUS2, and +VBUS3), and to ensure the reliable and safe operation of the information handling system in compliance with the International Electrotechnical Commission (IEC) Limited Power Source Standards (IEC 60950-1 and 62368-1), as described further below. For example, FIG. 1 illustrates information handling system 100 as being connected to a 20 volt (V)/90 Watt (W) power source 102 via connector 112, to a thumb drive 104 via connector 114, and to a solid state drive (SSD) 106 via connector 116. As such, controller 116 provides the enable (EN) signal to selector 114 to connect +VBUS1 to the system main power bus (V_System) and internally opens the switch to disconnect +VBUS1 from the 5V bus, controller 126 removes the enable (EN) signal to selector 124 to disconnect +VBUS2 from the system main power bus (V_System) and internally closes the switch to connect +VBUS2 to the 5V bus, and controller 136 removes the enable (EN) signal to selector 134 to disconnect +VBUS3 from the system main power bus (V_System) and internally closes the switch to connect +VBUS3 to the 5V bus. Controllers 116, 126, and 136 thus operate to communicate with connected devices 102, 104, and 106 to determine the types of the devices in order to determine the correct connectivity for power distribution. It will be understood that the system described herein provides a great deal of flexibility to source/receive power to the connected devices as needed or desired based upon the type of connected devices.

Each of connectors 112-132 can source/receive power at different voltages. For example, the USB Power Delivery Specification permits USB-C ports to receive power of between 4.5 W (such as at 5V) and 240 W (such as at 48V), while devices powered from USB-C ports operate at 5V DC. Thus it can be seen that a failure of one or more of selectors 114-134, for example by shorting respective internal power bus (+VBUS1, +VBUS2, or +VBUS3) to the system main power bus (V_System) may result in a hazardous situation when a device configured to receive 5V power is connected to the failing selector. As such, the IEC LPS specifies in summary that a single-point failure may result in an internal high-power computer bus being driven back to a low-power device (defined as <100 W).

In a particular embodiment, information handling system 100 operates to ensure that no single-point failure results in the system main power bus (V_System) being connected to the internal power buses (+VBUS1, +VBUS2, or +VBUS3). In particular, each of controllers 116, 126, and 136 are configured to continuously monitor their respective internal power buses (+VBUS1, +VBUS2, or +VBUS3) for abnormal or our out-of-compliance voltage levels. In this regard, controllers 116, 126, and 136 each include a voltage sense input (SEN) that is connected to their respective internal power buses (+VBUS1, +VBUS2, or +VBUS3) (illustrated herein by the dotted line connections between the internal power buses and the voltage sense inputs (SEN), and the controllers are configured to detect when their respective internal power buses exhibit abnormal or out-of-compliance voltage levels.

Controllers 116, 126, and 136 each include a bi-directional general-purpose input/output (GPIO) connection that is configured to provide an indication of an over-voltage condition on their respective voltage sense inputs (SEN). Here, the over-voltage indication (OVP) is provided as an active-low signal (OVP #), and each of the over-voltage outputs are connected together in a wired-OR configuration with an associated pull-up resistor pulling the over-voltage outputs to a normal logic "HI" state. In a particular embodiment, the pull-up resistor is provided to an internal 3.3V bus. Here, when one of controllers 116, 126, or 136 detects an over-voltage condition and asserts its over-voltage indication (OVP #), the wired-OR configuration ensures that the over-voltage indication is provided as an input to each of the other controllers, and the over-voltage condition on any one of the controllers is rapidly communicated to all of the other controllers. Here, it will be understood that controllers 116, 126, and 136 are each configured to understand what voltage is expected on their respective internal power buses (+VBUS1, +VBUS2, and +VBUS3) based upon the functionality of the controllers in conformance with the USB Power Delivery Specification. The details of establishing power connections between external devices and an information handling system and the associated power conditioning is known in the art and will not be further described herein, except as may be needed to illustrate the current embodiments.

In the event of an over-voltage condition, whether determined by a particular one of controllers 116, 126, or 136 detecting an over-voltage condition and asserting the associated over-voltage indication (OVP #), or determined by the other controllers receiving the over-voltage indication on their respective OVP #connection, all of the controllers operate to isolate their respective internal power buses (+VBUS1, +VBUS2, and +VBUS3) from both the system main power bus (V_System) and the 5V bus. In particular, when the over-voltage indication (OVP #) is asserted, controller 116 removes the enable (EN) signal to selector 114 to disconnect +VBUS1 from the system main power bus (V_System) and internally opens the switch to disconnect +VBUS1 from the 5V bus, controller 126 removes the enable (EN) signal to selector 124 to disconnect +VBUS2 from the system main power bus (V_System) and internally opens the switch to disconnect +VBUS2 from the 5V bus, and controller 136 removes the enable (EN) signal to selector 134 to disconnect +VBUS3 from the system main power bus (V_System) and internally opens the switch to disconnect +VBUS3 from the 5V bus. In this way, no single-point failure persists that shorts any of selectors 114, 124, or 134 to connect the system main power bus (V_System) or the 5V bus to the internal power buses (+VBUS1, +VBUS2, or +VBUS3). In particular embodiment, an over-voltage condition can be detected when an internal power bus (+VBUS1, +VBUS2, or +VBUS3) that is intended to be supplying the 5V bus exhibits a voltage level greater than 6.25V+/−0.25 milliVolts (mV), or when an internal power bus that is intended to be receiving power exhibits a voltage level greater than 130% of the intended voltage level for the connected device.

An example of detailed operations of controllers 116, 126, and 136 is provided as follows. Controllers 116, 126, and 136 may operate to keep the over-voltage indication (OVP #) deasserted, that is, in the logic "HI" state when 1) a sourcing/receiving device is connected to associated connector 112, 122, and 132, 2) when a voltage applied to the respective internal power bus (+VBUS1, +VBUS2, or +VBUS3) is sufficient to power up the associated controller 116, 126, and 136 low-drop out (LDO) controller, 3) no AC power is provided to information handling system 100 with the information handling system in a pre-boot phase or OS start phase, and the LDO controller is active, 4) when no device is connected to the associated connector with the information handling system in a pre-boot phase or OS start phase, and the LDO controller is active, 5) the information handling system is in a dead battery mode (S4/S5) (because the internal power buses (+VBUS1, +VBUS2, and +VBUS3), the system main power bus (V_System), and the 5V bus are all at or around 0V. Controllers 116, 126, and 136 may operate to assert the over-voltage indication (OVP #), that is, in the logic "LOW" state when the over-voltage condition is detected, as described above.

In a particular embodiment, controllers 116, 126, and 136 operate to latch the presence of an over-voltage condition in order to maintain the isolation of the respective internal power buses (+VBUS1, +VBUS2, and +VBUS3) from the system main power bus (V_System), and the 5V bus. In particular, when a fault occurs, the power isolation is ensured until all source devices are disconnected from the associated connector 112, 122, or 132. Moreover, the affected one of controllers 116, 126, and 136 will not issue a reset to the connected source device, and the over-voltage condition and over-voltage indication (OVP #) will persist until such time as all connected source devices are disconnected. In order to ensure that controllers 116, 126, and 136 remain powered until the connected source devices are disconnected, the controllers are powered by their respective internal power buses (+VBUS1, +VBUS2, and +VBUS3).

It will be understood that information handling system 100 is illustrated as including three (3) USB-C ports, but that a greater number, or a lesser number of USB-C ports may be provided and may be included within the protection scheme as provided herein by similarly connecting the controller over-voltage indications (OVP #) to the wired-OR configuration, as needed or desired. Note further that more than one over-voltage protection domain may be provided on an information handling system as needed or desired. For example, where in information handling system includes six (6) or more USB-C ports, a first over-voltage protection domain may be provided for three (3) of the USB-C ports, and a second over-voltage protection domain may be provided for the remaining three (3) USB-C ports.

Figure 2:
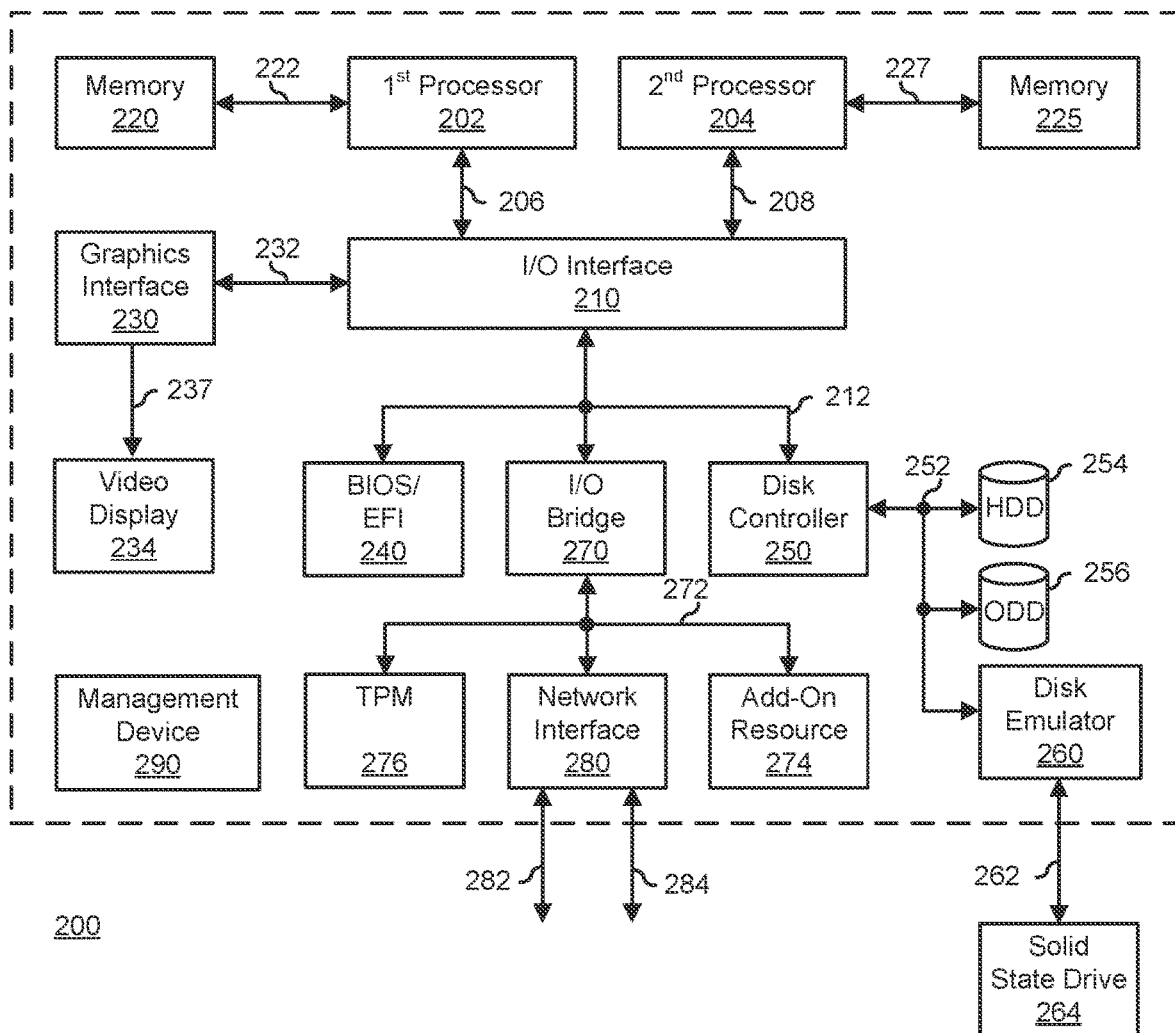
FIG. 2 is a block diagram illustrating a generalized information handling system according to another embodiment of the present disclosure.

FIG. 2 illustrates a generalized embodiment of an information handling system 200. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 200 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 200 can include processing resources for executing machine-executable code, such as a central processing unit (CPU), a programmable logic array (PLA), an embedded device such as a System-on-a-Chip (SoC), or other control logic hardware. Information handling system 200 can also include one or more computer-readable medium for storing machine-executable code, such as software or data. Additional components of information handling system 200 can include one or more storage devices that can store machine-executable code, one or more communications ports for communicating with external devices, and various input and output (I/O) devices, such as a keyboard, a mouse, and a video display. Information handling system 200 can also include one or more buses operable to transmit information between the various hardware components.

Information handling system 200 can include devices or modules that embody one or more of the devices or modules described below, and operates to perform one or more of the methods described below. Information handling system 200 includes a processors 202 and 204, an input/output (I/O) interface 210, memories 220 and 225, a graphics interface 230, a basic input and output system/universal extensible firmware interface (BIOS/UEFI) module 240, a disk controller 250, a hard disk drive (HDD) 254, an optical disk drive (ODD) 256, a disk emulator 260 connected to an external solid state drive (SSD) 262, an I/O bridge 270, one or more add-on resources 274, a trusted platform module (TPM) 276, a network interface 280, a management device 290, and a power supply 295. Processors 202 and 204, I/O interface 210, memory 220, graphics interface 230, BIOS/UEFI module 240, disk controller 250, HDD 254, ODD 256, disk emulator 260, SSD 262, I/O bridge 270, add-on resources 274, TPM 276, and network interface 280 operate together to provide a host environment of information handling system 200 that operates to provide the data processing functionality of the information handling system. The host environment operates to execute machine-executable code, including platform BIOS/UEFI code, device firmware, operating system code, applications, programs, and the like, to perform the data processing tasks associated with information handling system 200.

In the host environment, processor 202 is connected to I/O interface 210 via processor interface 206, and processor 204 is connected to the I/O interface via processor interface 208. Memory 220 is connected to processor 202 via a memory interface 222. Memory 225 is connected to processor 204 via a memory interface 227. Graphics interface 230 is connected to I/O interface 210 via a graphics interface 232, and provides a video display output 236 to a video display 234. In a particular embodiment, information handling system 200 includes separate memories that are dedicated to each of processors 202 and 204 via separate memory interfaces. An example of memories 220 and 230 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 240, disk controller 250, and I/O bridge 270 are connected to I/O interface 210 via an I/O channel 212. An example of I/O channel 212 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 210 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 240 includes BIOS/UEFI code operable to detect resources within information handling system 200, to provide drivers for the resources, initialize the resources, and access the resources. BIOS/UEFI module 240 includes code that operates to detect resources within information handling system 200, to provide drivers for the resources, to initialize the resources, and to access the resources.

Disk controller 250 includes a disk interface 252 that connects the disk controller to HDD 254, to ODD 256, and to disk emulator 260. An example of disk interface 252 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 260 permits SSD 264 to be connected to information handling system 200 via an external interface 262. An example of external interface 262 includes a USB interface, an IEEE 2394 (Firewire) interface, a proprietary interface, or a combination thereof. Alternatively, solid-state drive 264 can be disposed within information handling system 200.

I/O bridge 270 includes a peripheral interface 272 that connects the I/O bridge to add-on resource 274, to TPM 276, and to network interface 280. Peripheral interface 272 can be the same type of interface as I/O channel 212, or can be a different type of interface. As such, I/O bridge 270 extends the capacity of I/O channel 212 when peripheral interface 272 and the I/O channel are of the same type, and the I/O bridge translates information from a format suitable to the I/O channel to a format suitable to the peripheral channel 272 when they are of a different type. Add-on resource 274 can include a data storage system, an additional graphics interface, a network interface card (NIC), a sound/video processing card, another add-on resource, or a combination thereof. Add-on resource 274 can be on a main circuit board, on separate circuit board or add-in card disposed within information handling system 200, a device that is external to the information handling system, or a combination thereof.

Network interface 280 represents a NIC disposed within information handling system 200, on a main circuit board of the information handling system, integrated onto another component such as I/O interface 210, in another suitable location, or a combination thereof. Network interface device 280 includes network channels 282 and 284 that provide interfaces to devices that are external to information handling system 200. In a particular embodiment, network channels 282 and 284 are of a different type than peripheral channel 272 and network interface 280 translates information from a format suitable to the peripheral channel to a format suitable to external devices. An example of network channels 282 and 284 includes InfiniBand channels, Fibre Channel channels, Gigabit Ethernet channels, proprietary channel architectures, or a combination thereof. Network channels 282 and 284 can be connected to external network resources (not illustrated). The network resource can include another information handling system, a data storage system, another network, a grid management system, another suitable resource, or a combination thereof.

Management device 290 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 200. In particular, management device 290 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 200, such as system cooling fans and power supplies. Management device 290 can include a network connection to an external management system, and the management device can communicate with the management system to report status information for information handling system 200, to receive BIOS/UEFI or system firmware updates, or to perform other task for managing and controlling the operation of information handling system 200. Management device 290 can operate off of a separate power plane from the components of the host environment so that the management device receives power to manage information handling system 200 when the information handling system is otherwise shut down. An example of management device 290 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 290 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a power supply configured to provide a main power bus and a secondary power bus; and
   a first USB-C port including:
   　a first USB-C connector configured to provide a first internal power bus;
   　a first input selector configured to selectively couple the first internal power bus to the main power bus; and
   　a first controller including a first general purpose input/output (GPIO), the first controller configured to enable the first input selector to couple the first internal power bus to the main power bus and to disable the first input selector from coupling the first internal power bus to the main power bus, and to selectively couple the secondary power bus to the first internal power bus; and
   a second USB-C port including:
   　a second USB-C connector configured to provide a second internal power bus;
   　a second input selector configured to selectively couple the second internal power bus to the main power bus; and
   　a second controller including a second GPIO, the second controller configured to enable the second input selector to couple the second internal power bus to the main power bus and to disable the second input selector from coupling the second internal power bus to the main power bus, and to selectively couple the secondary power bus to the second internal power bus, wherein the first GPIO is coupled to the second GPIO in a wired-OR configuration;

wherein the first controller determines that an over-voltage condition is exhibited on the first internal power bus, and, in response to determining the over-voltage condition, disables the first input selector from coupling the first internal power bus to the main power bus, uncouples the secondary power bus from the first internal power bus, and provides an overvoltage indication on the first GPIO;

wherein the second controller receives the over-voltage indication on the second GPIO, and, in response to receiving the over-voltage indication, disables the second input selector from coupling the second internal power bus to the main power bus and uncouples the secondary power bus from the second internal power bus; and.

2. The information handling system of claim 1, wherein the first controller and the second controller each operate to latch the over-voltage indication.

3. The information handling system of claim 2, wherein the over-voltage indication remains latched until a power source device is disconnected from one of the first USB-C connector or the second USB-C connector.

4. The information handling system of claim 3, wherein, while the over-voltage indication is latched, the first controller receives power from the first internal power bus and the second controller receives power from the second internal power bus.

5. The information handling system of claim 3, wherein, while the over-voltage indication is latched, neither the first controller nor the second controller issues a reset to the power source device.

6. The information handling system of claim 1, wherein the secondary power bus is a five (5) volt bus.

7. A method, comprising:
providing, on an information handling system, a power supply configured to provide a main power bus and a secondary power bus;
providing, on the information handling system, a first USB-C port including:
  a first USB-C connector configured to provide a first internal power bus;
  a first input selector configured to selectively couple the first internal power bus to the main power bus; and
  a first controller including a first general purpose input/output (GPIO), the first controller being configured to enable the first input selector to couple the first internal power bus to the main power bus and to disable the first input selector from coupling the first internal power bus to the main power bus, and to selectively couple the secondary power bus to the first internal power bus;
providing, on the information handling system, a second USB-C port including:
  a second USB-C connector configured to provide a second internal power bus;
  a second input selector configured to selectively couple the second internal power bus to the main power bus; and
  a second controller including a second GPIO, the second controller being configured to enable the second input selector to couple the second internal power bus to the main power bus and to disable the second input selector from coupling the second internal power bus to the main power bus, and to selectively couple the secondary power bus to the second internal power bus;

coupling the first GPIO to the second GPIO in a wired-OR configuration;
determining, by the first controller, that an over-voltage condition is exhibited on the first internal power bus;
in response to determining the over-voltage condition:
  disabling, by the first controller, the first input selector from coupling the first internal power bus to the main power bus;
  uncoupling, by the first controller, the secondary power bus from the first internal power bus in response to determining the over-voltage condition; and
  providing, by the first controller, an over-voltage indication on the first GPIO; and
in response to receiving the over-voltage indication:
  disabling, by the second controller, the second input selector from coupling the second internal power bus to the main power bus; and
  uncoupling, by the second controller, the secondary power bus from the second internal power bus.

8. The method of claim 7, further comprising:
latching, by the first controller and the second controller, the over-voltage indication.

9. The method of claim 8, wherein the over-voltage indication remains latched until a power source device is disconnected from one of the first USB-C connector or the second USB-C connector.

10. The method of claim 9, wherein, while the over-voltage indication is latched, the first controller receives power from the first internal power bus and the second controller receives power from the second internal power bus.

11. The method of claim 9, wherein, while the over-voltage indication is latched, neither the first controller nor the second controller issues a reset to the power source device.

12. An information handling system, comprising:
a power supply configured to provide a main power bus and a secondary power bus;
a first USB-C port including:
  a first USB-C connector configured to provide a first internal power bus;
  a first input selector configured to selectively couple the first internal power bus to the main power bus; and
  a first controller including a first general purpose input/output (GPIO), the first controller configured to enable the first input selector to couple the first internal power bus to the main power bus and to disable the first input selector from coupling the first internal power bus to the main power bus, and to selectively couple the secondary power bus to the first internal power bus; and
a second USB-C port including:
  a second USB-C connector configured to provide a second internal power bus;
  a second input selector configured to selectively couple the second internal power bus to the main power bus; and
  a second controller including a second GPIO, the second controller configured to enable the second input selector to couple the second internal power bus to the main power bus and to disable the second input selector from coupling the second internal power bus to the main power bus, and to selectively couple the secondary power bus to the second internal power bus, wherein the first GPIO is coupled to the second GPIO in a wired-OR configuration;

wherein the first controller:
  determines that an over-voltage condition is exhibited on the first internal power bus; and
  in response to determining the over-voltage condition, disables the first input selector from coupling the first internal power bus to the main power bus, uncouples the secondary power bus from the first internal power bus wherein, when the over-voltage condition is exhibited on the first internal power bus, the first controller is powered by the first internal power bus, and provides an overvoltage indication on the first GPIO;

wherein the second controller:
  receives the over-voltage indication on the second GPIO; and
  in response to receiving the over-voltage indication, disables the second input selector from coupling the second internal power bus to the main power bus and uncouples the secondary power bus from the second internal power bus;

wherein the first controller further:
  latches an indication of the over-voltage condition;
  determines that a power source device is disconnected from the first USB-C connector and that the over-voltage condition is no longer exhibited on the first internal power bus; and
  unlatches the indication in response to determining that the power source device is disconnected and that the over-voltage condition is no longer exhibited.

* * * * *